Oct. 16, 1951 — M. P. BLOMBERG — 2,571,410
BRAKE SHOE SUPPORT MECHANISM
Filed May 24, 1946 — 2 Sheets-Sheet 1
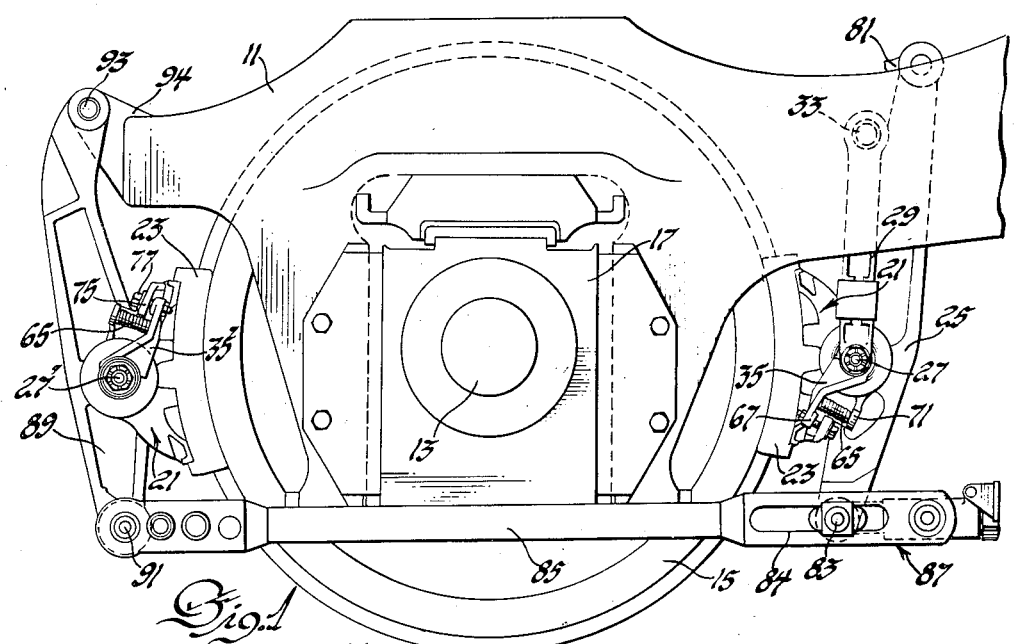
Fig. 1
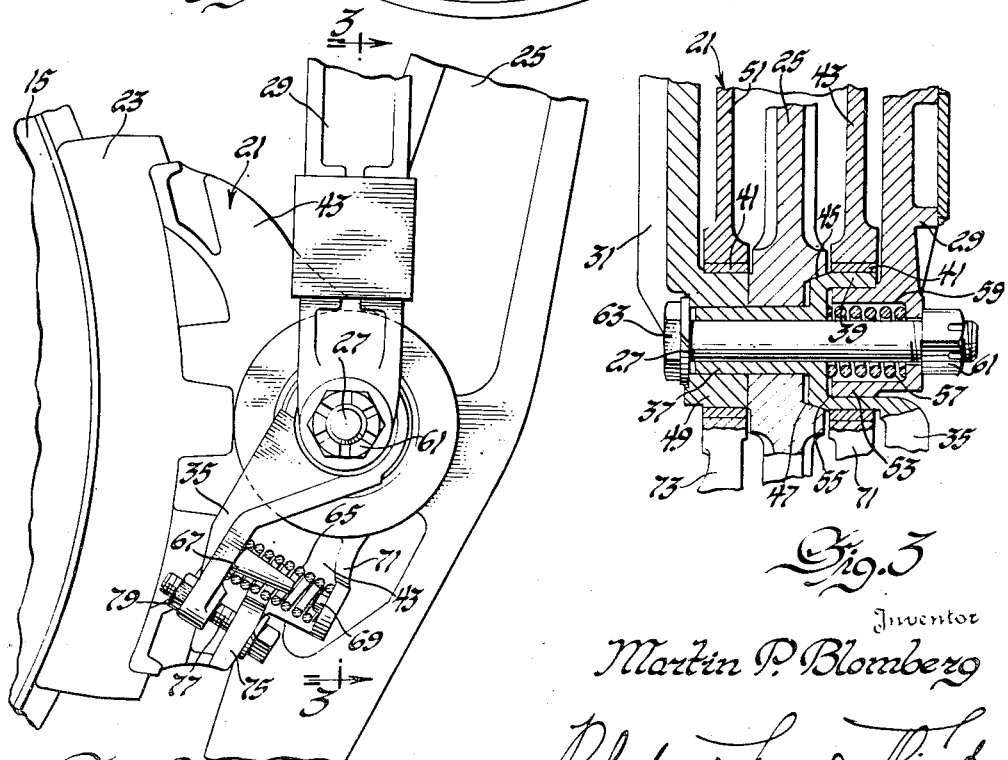
Fig. 2
Fig. 3
Inventor
Martin P. Blomberg
Blackmore, Spencer & Flint
Attorneys

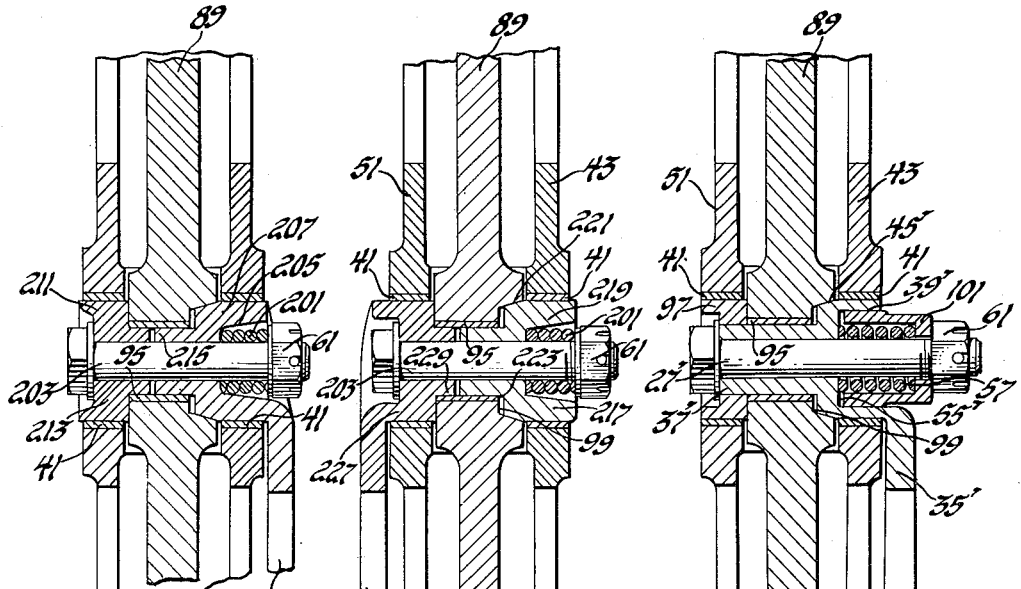
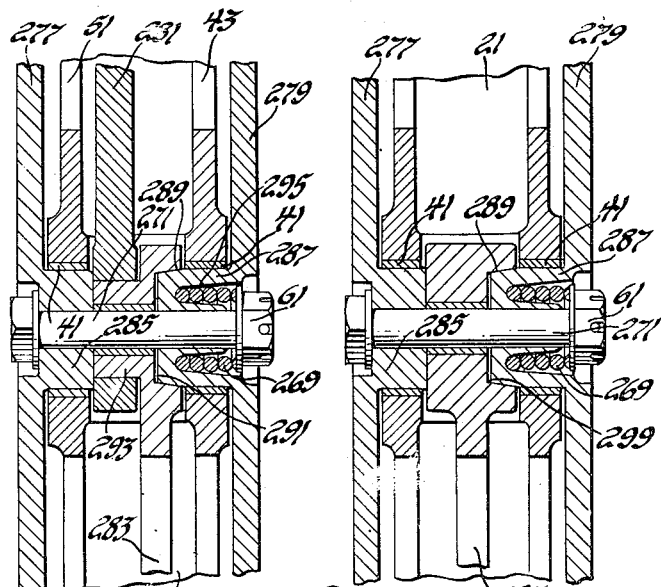

Patented Oct. 16, 1951

2,571,410

UNITED STATES PATENT OFFICE 2,571,410

BRAKE SHOE SUPPORT MECHANISM

Martin P. Blomberg, Hinsdale, Ill., assignor to General Motors Corporation, Detroit, Mich., a corporation of Delaware Application May 24, 1946, Serial No. 672,093

9 Claims. (Cl. 188—206)

This invention relates to brake rigging for railway vehicles and more particularly to improved balancing means for brake heads supporting brake shoes.

The principal object of the invention is to provide brake heads and automatically adjustable balancing means therefor to insure concentric positioning of the brake heads and brake shoes with respect to the wheels irrespective of the wheel and shoe wear thereby insuring uniform wear and longer shoe and wheel life.

Other objects and advantages of my invention wil become apparent by reference to the following detailed description and accompanying drawings, illustrating one form of the invention associated with a clasp type braking arrangement for which it is particularly adapted.

Figure 1 of the drawings is a side elevation view of one end of a railway vehicle truck provided with clasp type brake rigging and including my improved brake head balancing means therefor.

Figure 2 is an enlarged fragmentary side elevation view showing details of the invention.

Figure 3 is a sectional view taken on line 3—3 of Figure 2.

Figures 4 to 8 are views similar to Figure 3 showing modifications of the invention.

In Figure 1 of the drawings the character reference 11 indicates a portion of the side frame of a multiaxle truck, the axles 13 of which, having wheels 15 secured thereon, are rotatably mounted in journal boxes 17 movably guided in the side frame 11 in conventional manner.

The truck is provided with brake rigging of the clasp type including a pair of identical brake shoe heads indicated generally at 21 for each truck wheel in which brake shoes 23 are keyed and automatic balancing or adjusting means for the heads to be subsequently described in detail.

As best illustrated in Figures 1 and 2 the brake head 21 to the right of the wheel 15, the balancing means and a brake actuating lever 25 therefor are mounted for rotation on a bolt 27 supported at the ends in transversely aligned openings in the lower ends of hanger links 29—31 and said openings located slightly below the wheel center. The hanger links 29—31 are pivoted for longitudinal swinging movement relative to the frame in the plane of the wheel on a pin 33 carried by the frame and extending through openings in the upper ends of the hangers.

As best illustrated in Figures 2 and 3 one element of the automatic balancing means is a friction arm 35 having a small diameter hub end portion 37 shown on the bolt 27 and extending through openings in the lever 25 and hanger 31. A larger diameter hub portion 39 on the friction arm is shown extending through a bushing 41 in the outer web 43 of the head 21 and this hub portion 39 has a tapered external end surface 45 shown in engagement with a tapered internal surface of a counterbore 47 in the outer face of the lever 25. The inner hanger 31 has an inwardly extending hub portion 49 on which another bushing 41 in the other web 51 of the brake head 21 is rotatably mounted. The outer hanger 29 is also provided with an inwardly extending hub portion 53 shown extending into a counterbore 55 in the enlarged diameter hub portion 39 of the friction arm 35. A compression spring 57 is placed in the space formed between the counterbore 55 in the hub portion 39 of the friction arm and a counterbore 59 in the inner end of the hub portion 53 of the outer hanger 29. A nut 61 threaded on the outer end of the bolt 27 engages the outer face of the outer hanger 29 and draws the head 63 of the bolt against the inner face of the hanger 31 to cause compression of the spring 57 between the hanger 29 and the hub portion 39 of the friction arm 35 thereby causing the tapered surface 45 of the hub of the friction arm to be frictionally engaged to the tapered surface of the counterbore 47 of the lever 25 but allowing the brake head 21 to rotate freely on the hub portions 39—49 of the friction arm 35 and inner hanger 31.

As best shown in Figure 2 the friction arm 35 is on the outside of the truck and faces downwardly. A compression spring 65 is placed around a boss 67 of the friction arm 35 and extends to a boss 69 on a lug 71 on the web 43 of the brake head 21. The other web 51 of the brake head 21 is provided with a similar boss on a lug 73. The brake head 21 is also provided with a lug 75 extending transversely across one end thereof and having openings in either end. As shown in Figure 2 an adjusting screw 77 is placed in the opening in the lug 75 on the outside of the truck and is threaded in an opening in the end of the friction arm 35 and a lock nut 79 on the screw engages the end of the arm and counterclockwise movement or adjustment of the brake head 21 relative to the friction arm 35 by the force exerted therebetween by the spring 65 causes contact between the lug 75 of the head 21 with the head of the adjusting screw 77 to limit counterclockwise movement of the head relative to the arm. The upper end of the brake actuating lever 25 is connected by a link 81 to the piston of the air brake cylinder, not shown. The lower end of the lever 25 is connected by a pin 83 shown in slots 84 in the ends of straddle bars 85 having a slack adjuster, indicated generally at 87 associated therewith for adjusting the pin 83 relative to the slots 84. The other ends of the straddle bars 85 are connected to the lower end of another brake lever 89 by a pin 91 and the upper end of the lever 89 is pivoted for longitudinal swinging movement to the left and in the plane of the wheel 15 on a pin 93 carried in an upper bracket 94 of the truck frame 11.

Another assembly comprising a brake head 21, friction arm 35', springs 57—65, adjusting screw 77 and lock nut 79 is shown mounted directly on the lever 89 intermediate the ends and slightly below the wheel center on another bolt 27'. Figures 4 to 6 illustrate various modifications of the mounting of the assembly directly on the lever 89. For instance in the modification shown in Figure 6 the smaller diameter hub portion 37' of the friction arm 35' is shown on the bolt 27' and extends through a bushing 95 in the lever 89 and into a collar 97 on which the bushing 41 in the web 51 of the brake head is rotatably mounted. The bushing 41 in the other web 43 of the brake head 21 is rotatably mounted on the enlarged diameter hub portion 39' of the friction arm 35' and the tapered external surface 45' thereon is shown in contact with an internally tapered surface of a counterbore 99 in the lever 89. The spring 57 is placed in the space formed by the counterbore 55' in the friction arm hub portion 39' and a cap 101 on the outer end of the bolt 27'. It will be evident that when the nut 61 on the bolt is drawn up the nut will engage the cap 101 and draw the head of the bolt into engagement with the collar 97 to compress the spring 57 thereby holding the tapered surface 45' on the hub of the friction lever 35' in frictional contact with the tapered counterbore 99 of the lever 89. It will be evident from the above that both the friction arms 35—35' are thus held in frictional engagement with the respective brake levers 25—89 located on opposite sides of the wheel 15 and the end of each of the friction arms 35—35' face toward the fulcrum ends of the levers formed by the pins 93—93. The spring 65 between the downwardly facing friction arm 35 and the head 21 to the right of the wheel 15 tends to move the head counterclockwise relative to the lever 25 an amount determined by contact of the lug 75 on this head with the head of the adjusting screw 77 threaded in the friction arm and the spring 65 between the upwardly facing friction arm 35' and the head 21 on the left side of the wheel likewise tends to urge this head in the same direction, counterclockwise relative to the lever 89 until the head lug 75 contacts the head of the adjusting bolt 77.

With the brake shoes 23 supported in the heads 21 on either side of the wheel 15 in concentric relation therewith by action of the springs 65 between the levers 25—89 and friction arms 35—35' which are frictionally engaged with the respective levers 25—89, to retain the head lugs 75 in contact with the head of the adjusting screws 77 in the friction arms the operation is as follows upon application of the brake shoes 23 to opposite sides of the wheel 15.

Movement of the upper end of the lever 25 counterclockwise by the piston of the air brake cylinder causes the friction arm, head and shoe to the right of the wheel to move in the same direction counterclockwise about the pin 83 serving as the fulcrum and causes slight movement of the straddle bars 85 to the right thereby causing the other brake lever 89 to be also moved in a counterclockwise direction about the pin 93 serving as a fulcrum. As the friction arms 35—35' are frictionally engaged with the levers 25—89 and the springs 65 urge the brake heads 21 counterclockwise relative to the levers and retain the brake head lugs 75 in contact with the heads of the adjusting bolts 77 in the friction arms the upper end of the brake shoe 23 to the right of the wheel and the lower end of the shoe 23 to the left of the wheel will contact the wheel first causing the shoes 23, heads 21 and lugs 75 thereon to move clockwise relative to the levers 25—89 and adjusting screws 77 on the friction arms 35—35' and compress the springs 65 to permit concentric engagement of the shoes on opposite sides of the wheel. Release of the brakes is caused by movement of the levers 25—89 clockwise about the fulcrum points 83—93 and counterclockwise movement of the heads and shoes relative thereto is caused by action of the springs 65 between the heads 21 and friction arms 35—35' frictionally engaged on the levers so that the head lugs 75 are again moved into contact with the heads of the adjusting bolts in the friction arms 35—35' to again position the shoes 23 in concentric release relation with respect to the wheel. As wear of the shoes 21 and wheel 15 progresses increased counterclockwise movement of the levers 25—89 is required to cause concentric engagement of the shoes with the wheel and when the wear reaches a certain point the head lugs 75 engage and move the ends of the friction arms 35—35' clockwise with respect to the levers 25—89 to a new position upon engagement of the shoes with the wheel by slippage between the frictionally engaged tapered surfaces on the friction arms and levers. Upon subsequent disengagement or release of the shoes 23, the springs 65 between the friction arms 35—35' in their new position on the levers 25—89 will cause corresponding clockwise movement of the head 21 and shoes 23 relative to the arms to a new corresponding position by contact between the head lugs 75 and heads of the adjusting screws 77. Adjustment of the friction arms relative to the levers taking place on successive brake applications of the brakes on account of wear and corresponding adjustment of the heads and shoes taking place upon subsequent release of the brakes serves to automatically position the heads and shoes in concentric relation of the wheels as wear of the shoes and wheels progresses. The above operation of the brake head balancing means insures proper automatic balancing or adjustment of the friction arms upon application followed by automatic adjustment of the heads and upon release of the brakes insures uniform wear of the shoes and this results in longer life of the shoes and wheels. As the heads 21 are provided with lugs 71 on each web and a lug 75 extending across one end adjacent thereto and provided with openings at either end for adjusting bolt 77 and the friction arms 35—35' may be positioned on the outside of the truck, the heads and arms may be used on any wheel of the truck and may be supported on the hangers 29—31 and brake actuating lever 25 or supported on levers 89 in the manner described and all adjustments of the adjusting screws 77, located on the outside of the truck may accordingly be conveniently made.

It will be evident that the brake head 21 may be used with any convenient arrangement of brake levers, hangers and friction arms, each friction arm likewise being provided with a boss 67 by which a spring 65 may be located between this boss and a boss 69 on one side of the brake head. Each friction arm is also provided with means by which an adjusting screw 77 and lock nut 79 may be adjustably secured and locked to the friction arm to cooperate with a lug 75 on one side of the brake head in the same manner as described with reference to these elements shown in Figures 1, 2 and 3. In Figures 4, 5, 6, 8 and 9 each of the friction arms is also provided with similar means for this cooperation and with similar means for urging the friction arm into frictional engagement with brake lever means to provide operation identical to that described with the structures shown in Figures 1, 2, 3 and 6.

The modification shown in Figure 4 differs from that shown in Figure 6 described above by the placing of a spring 201 directly between the nut 61 on a bolt 203 and a counterbore 205 in the hub 207 of a friction arm 209 and providing a collar 211 with an inwardly extending hub portion 213 so that the bushing 95 rests on the hub portions 213 and 215 of the collar and friction arm. The spring 201 serves in the same manner to retain the tapered surfaces of the friction arm and lever in engagement.

The modification in Figure 5 differs from that shown in Figure 4 by providing a collar 217 having a large diameter portion 219 with a tapered surface 221 adapted to contact the tapered counterbore 99 of the lever 89 and a smaller diameter portion 223 and a friction arm 225 having a large diameter hub portion 227 and a smaller diameter portion 229. The bushings 41 in the head webs 43—51 being supported on the large diameter portions 217—227 of the collar and arm and the bushing 95 of the lever 89 being supported on the smaller diameter portions 223 and 229 thereof. The bolt 203 and nut 61 compresses the spring 201 and holds the tapered surfaces of the collar and lever in frictional contact and also frictionally connects the friction arm 225 with both the lever 89 and collar 217.

The modification shown in Figure 7 comprises two levers 277—279, a hanger 281 and a friction arm 283. The bushings 41 in the webs 43—51 of the brake head 21 are supported on the hub portions 285—287 of the levers 277—279. The hub portion 287 of the lever 279 has a tapered end 289 in engagement with a tapered counterbore 291 of the friction arm 283 having a hub portion 293 supported in an opening in the hanger 281. The spring 269 between the nut 61 on the bolt 271 and a counterbore 295 in the lever 279 holds the tapered surfaces of the arm and lever in frictional engagement and also holds the inner end face of the other lever hub portion 285 in frictional engagement with one face of the friction arm.

The modification in Figure 8 comprises two levers 277—279 identical to that shown in Figure 8 with the head 21 supported on the lever hub portions 285—287 and a friction arm 297 therebetween having a tapered counterbore 299 in engagement with the tapered end surface 289 of the lever 279. The spring 269 between the nut 61 on the bolt 271 holds the tapered surfaces of the friction arm 297 and lever 279 and one face of the friction arm and hub portion 285 of the other lever 277 in frictional engagement.

In all of the modifications of the invention shown in Figures 4 to 8 the friction arms are held in frictional engagement with a brake lever and serve in the same manner to automatically position a brake head and shoe in concentric relation with the wheel as the shoe and wheel wears.

From the above description of the various modifications of the invention the brake heads and shoes are adjusted concentrically with respect to the wheels when the brakes are released by the adjusting screws 77 and automatically adjusted to this position after application of the brakes followed by release, by action of the automatic brake head balancing means as wear of the shoes and wheels progresses.

I claim:

1. In a brake rigging for a vehicle wheel the combination of a brake lever angularly movable in the plane of the wheel, said lever having a bore extending therethrough parallel to the wheel axis and provided with a tapered counterbore at one end, a brake head having an arcuate face, opposite side projections adjacent one end, and aligned side bearing openings intermediate the ends, a brake shoe on the arcuate face of said brake head, annular support members in each side bearing opening of said head, one support member having a tapered end face engageable with the tapered counterbore and at least one support member having an arm extending radially outwardly from the outer end of a bearing opening of said brake head, said arm having spaced abutments thereon engageable with a side projection of said head, a bolt extending through the annular support members and the bore in said lever, said bolt having a head engageable with one support member and a nut threaded on the other end, a spring on said bolt compressed by said nut into engagement with the other support member to frictionally engage the tapered end of one support in the tapered counterbore of said lever, a second compression spring between said arm and a side projection of said head retaining a head projection in engagement with one abutment of said arm to retain said shoe in spaced concentric relation with respect to said wheel, the other abutment of said arm being engaged by a head projection upon excessive movement of said lever to apply the shoe to the wheel and to cause movement of said arm relative to said lever against the action exerted by both of said springs.

2. In a brake rigging for a vehicle wheel the combination of a brake lever angularly movable in the plane of the wheel, said lever having a bore extending therethrough parallel to the wheel axis and provided with a tapered counterbore in one end, a brake head having an arcuate face, side webs extending radially therefrom and having opposite side projections adjacent one end and enlarged diameter aligned side bearings intermediate the ends, a brake shoe on the arcuate face of said brake head, an annular support member in each side bearing of said head, one of said support members having a smaller diameter annular portion piloted in the bore of said lever and a tapered thrust face engageable with the tapered counterbore of said lever, at least one of said support members having an arm at the outer end provided with spaced abutments engageable with a head projection, a bolt extending through both support members and the bore in said lever and provided with a head engageable with one support member and a nut threaded on the other end, a spring on the bolt compressed between said nut and the other support member to cause frictional engagement of the tapered thrust face of one support member with the tapered counterbore of said lever and to cause frictional engagement of the other support member with the opposite side of said lever, a second compression spring between said arm and a head projection, to hold another head projection in engagement with an arm abutment and thereby retain said shoe in spaced concentric relation with the wheel, the other arm abutment being engaged and moved relative to said lever by a head projection against the action exerted by both said springs upon excessive movement of said lever necessary to cause concentric engagement of said shoe to the wheel.

3. In a brake rigging for a vehicle wheel the combination of a brake lever angularly movable in the plane of a wheel, said lever having a bore extending therethrough parallel to the wheel axis and provided with a tapered counterbore in one end, a brake head having an arcuate face, side webs extending transversely therefrom having opposite side projections adjacent one end and centrally located bushed openings, an annular support member in each bushed opening of said head, one support member having a tapered inner end face engageable with the tapered counterbore of said lever, a brake shoe on the arcuate face of said head, a bolt extending through the annular support members and the lever bore and provided with a head engageable with one support member and a nut threaded on the other end, a spring on the bolt compressed between the nut and one support member to continuously urge the tapered inner end face of one support member in frictional engagement with the tapered counterbore of the lever and to urge the inner end face of the other support member into frictional engagement with the opposite face of the lever, one of said support members having an arm on the outer end, said arm having an abutment engageable with a head projection and another abutment adjustably secured to said first abutment and also cooperating with the same head projection, a second compression spring between said arm and a head projection urging the first mentioned head projection into contact with the adjustable arm abutment to retain the shoe in spaced concentric relation with the wheel, the other arm abutment being engaged and moved by the first mentioned head projection relative to said lever against the combined force of both said springs upon excessive angular movement of the lever necessary to cause concentric frictional engagement of said shoe with the wheel.

4. In a brake rigging for a vehicle wheel the combination of a brake lever angularly movable in the plane of the wheel, said lever having a bore extending therethrough parallel to the wheel axis and provided with a tapered counterbore in the outer end, a bushing in the lever bore, a brake head having an arcuate face, spaced side webs extending outwardly therefrom and provided with opposite side projections and centrally located axially aligned bushed openings, a shoe removably secured to the face of said head, an outer annular support member rotatably supporting the outer bushed opening of the head and provided with an arm on the outer end and a tapered thrust face engageable with the tapered counterbore of the lever and also provided with a smaller diameter annular support extending through and rotatable in the bushing in the bore of said lever, an inner annular support member rotatably supporting the other bushed opening of said head and supported on the smaller diameter annular portion of the outer support member and engageable with the other side of the lever, a bolt extending through both support members having a head engageable with the inner support member and a nut threaded on the outer end, a third annular support member on said bolt adjacent the nut and rotatable in the outer annular support member, a spring on said bolt between said third and said outer support members urging the tapered thrust surface of said outer support member into frictional engagement with the tapered counterbore of said lever, a second bolt extending through an opening in an outer projection of said head and threaded to said arm, a second spring between said arm and a second outer projection of said head for urging said first projection into engagement with the head of said second bolt to hold said shoe in spaced concentric relation with the wheel, said first head projection engaging said arm and moving it relative to said lever against the combined action of both said springs upon excessive movement of said lever to cause concentric engagement of said shoe with the wheel.

5. In a brake rigging for a vehicle wheel the combination of a brake lever angularly movable in the plane of the wheel, said lever having a bore extending therethrough parallel to the wheel axis and provided with a tapered counterbore in the outer end, a bushing in the bore of said lever, a brake head having an arcuate face, side webs extending outwardly therefrom having opposite side projections adjacent one end and centrally located bushed openings therein, a brake shoe on the arcuate face of said brake head, inner and outer annular support members, each rotatable in one of the bushed openings of said head, each support member having a smaller diameter annular portion extending into the bushing in said lever bore, the outer support member having a tapered thrust face engageable in the tapered counterbore of said lever and having an arm on the outer end, a bolt extending through said support members having a head engageable with the inner support member and a nut threaded on the outer end, a spring on said bolt compressed between said nut for continuously urging the tapered thrust face of said outer support member into frictional engagement with the counterbore of said lever and also urging the inner end of said inner support member into frictional engagement with the opposite side of said lever, said arm being contactable with a projection on the outer web of said head, a second bolt threaded to said arm having a head also contactable with said projection, a second spring between said arm and another web projection urging said first mentioned projection into contact with the head of said second bolt to normally retain said shoe in spaced concentric relation with the wheel, said first projection engaging and moving said arm relative to said lever against the force exerted by both said springs upon excessive movement of said lever necessary to cause concentric engagement of said shoe with the wheel.

6. In a brake rigging for a vehicle wheel the combination of a brake lever angularly movable in the plane of the wheel, said lever having an opening extending therethrough parallel to the wheel axis and a tapered counterbore in the outer end, a brake head having an arcuate face, side webs extending outwardly therefrom and provided with opposite side projections adjacent one end and centrally located openings, a bushing in each web opening, inner and outer support members of annular form in each bushing of said head, each of said support members having a smaller diameter inner end portion extending into the bushing in the lever opening, said outer support member having a tapered thrust face engageable with the tapered counterbore of said lever, said inner support member having an arm on the outer end, a bolt extending through the support members and the lever opening and having a head engageable with the inner member and a nut threaded on the outer end, a spring on said bolt compressed between said outer member and said nut for continuously urging the thrust surface of said outer member into frictional engagement with the lever counterbore, said arm of the inner member being contactable with a projection of the inside web of the head, an abutment adjustably secured to said arm and also contactable with said projection, a second spring between another inside web projection and said arm urging said first mentioned web projection into contact with the adjustable abutment of said arm to hold said shoe in spaced concentric relation with the wheel, said first projection engaging and moving said arm relative to said lever against the combined force of both said springs upon excessive movement of said lever necessary to cause concentric engagement of said shoe with the wheel.

7. In a brake rigging for a vehicle wheel the combination of brake linkage means supported for angular movement in the plane of the wheel, a brake head having an arcuate face, opposite side projections adjacent one end and a bearing opening intermediate the ends, a brake shoe carried on the arcuate face of the brake head engageable with the wheel, bearing means carried by the brake linkage means and located in and rotatably supporting the bearing opening of the brake head about an axis parallel to the wheel axis, said brake linkage means having a tapered annular friction surface concentric with the bearing means carried thereby, a friction arm having a tapered annular frictional surface engageable with tapered annular frictional surface of said brake linkage means and spaced abutments engageable by a side projection of said brake head, resilient means urging the tapered annular surfaces of said brake linkage means and said friction arm into frictional engagement and additional resilient means urging a side projection of said brake head into engagement with one abutment of said friction arm.

8. In a brake rigging for a vehicle wheel the combination of a pair of spaced brake levers movable in the plane of the wheel and having annular hub portions, one of said hub portions having an inwardly extending annular tapered surface, a brake head having an arcuate face, opposite side projections adjacent one end and aligned bearing openings intermediate the ends rotatably supported on said lever hub portions about an axis parallel to the vehicle wheel, a brake shoe supported on the arcuate face of the brake head, a friction arm located between the annular hub portions of said levers and having an annular hub portion provided with an annular tapered friction surface engageable with the tapered annular surface of said lever hub portion, and spaced abutments on said arm engageable with a side projection of said head, supporting means pivotally supporting the annular hub portion of said friction arm, clamping means extending through the annular hub portions of said levers and said friction arm, spring means on said clamping means urging the tapered annular surfaces of said friction arm and said lever hub portion into frictional engagement and additional spring means urging a side projection of said head into engagement with one of the abutments of said friction arm.

9. In a brake rigging for a vehicle wheel the combination of a pair of spaced brake levers movable in the plane of the wheel and having annular hub portions, one of said hub portions having an inwardly extending tapered annular surface, a brake head having an arcuate face, opposite side projections adjacent one end and opposite side bearings rotatably supported on the annular hub portions of said levers about an axis parallel to the axis of the vehicle wheel, a brake shoe supported on the arcuate face of the brake head, a friction arm having an annular hub portion provided with a tapered annular surface engageable with the tapered annular surface of said lever hub portion and having spaced abutments engageable with a side projection of said brake head, clamping means extending through the annular hub portions of said brake levers and said friction arm, spring means on said clamping means urging the tapered annular surfaces of said friction arm and said lever hub portion into frictional engagement and additional spring means urging a side projection of said brake head into engagement with one abutment of said friction arm.

MARTIN P. BLOMBERG.

REFERENCES CITED

The following references are of record in the file of this patent:

UNITED STATES PATENTS

| Number | Name | Date |
| --- | --- | --- |
| 1,686,648 | Baselt | Oct. 9, 1928 |
| 2,079,554 | Hedgcock | May 4, 1937 |
| 2,394,382 | Holin | Feb. 5, 1946 |